United States Patent
DePierre

[15] 3,685,125
[45] Aug. 22, 1972

[54] DOLLY FOR HANDLING LARGE WHEELS AS FOR AIRCRAFT

[72] Inventor: Robert J. DePierre, Paw Paw Township, Van Buren County, Mich.

[73] Assignee: Kalamazoo Manufacturing Company, Kalamazoo, Mich.

[22] Filed: May 14, 1970

[21] Appl. No.: 37,284

[52] U.S. Cl.....................................29/252, 214/331
[51] Int. Cl..........................B23p 19/04, B60b 29/00
[58] Field of Search ........29/252; 214/330, 331, 332, 214/333; 105/21.5

[56] References Cited
UNITED STATES PATENTS 3,214,042  10/1965  Westrum....................214/330

*Primary Examiner*—Andrew R. Juhasz
*Assistant Examiner*—Gary L. Smith
*Attorney*—Woodhams, Blanchard & Flynn

[57] ABSTRACT

A wheel handler apparatus for transporting and handling large diameter and/or heavy wheels, particularly wheels for aircraft. The apparatus includes a frame supported on a plurality of rollers and having coupling means for permitting same to be suitably connected to a towing vehicle. The frame includes a main support axle adapted to have the large and/or heavy wheels removably supported on the opposite ends thereof. A wheel transfer structure is mounted on the axle and includes engaging device adapted to coact with the web plate of the wheel for permitting the wheel to be axially drawn onto and supported on the main axle or moved axially outwardly off of the axle so as to be piloted onto a support hub on which the wheel is to be mounted. The frame is provided with an elevating mechanism for permitting the wheel to be elevated so as to be aligned with the support hub. When wheels are supported by the handler, the elevating mechanism is preferably retractable to permit the wheels to rollingly engage the ground.

18 Claims, 8 Drawing Figures

PATENTED AUG 22 1972

INVENTOR
ROBERT J. DEPIERRE
BY
Woodhams, Blanchard & Flynn
ATTORNEYS

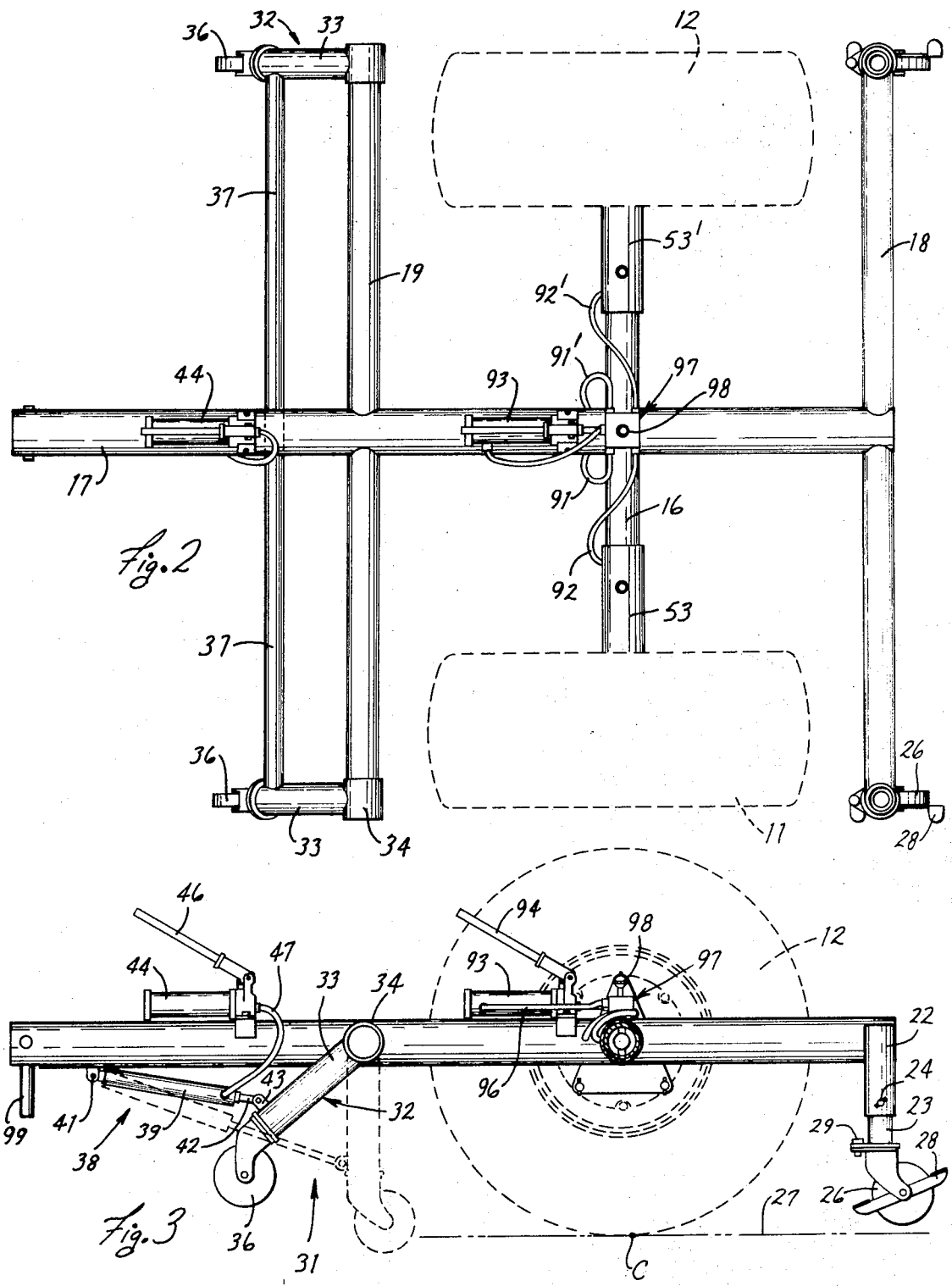

PATENTED AUG 22 1972 3,685,125

INVENTOR
ROBERT J. DEPIERRE
BY
Woodhams, Blanchard & Flynn
ATTORNEYS 3,685,125

DOLLY FOR HANDLING LARGE WHEELS AS FOR AIRCRAFT

FIELD OF THE INVENTION

This invention relates to a wheel handling apparatus and, in particular, relates to an apparatus for handling large diameter and/or heavy wheels particularly suitable for use on aircraft. The apparatus is suitable for not only transporting the wheels between remote locations, but is also provided with means for permitting the wheels to be transferred onto or off of the aircraft support hub.

BACKGROUND OF THE INVENTION

The problem of how to easily and efficiently transport and change aircraft wheels has long confronted aircraft maintenance personnel. In the early days of aviation, the wheels utilized on aircrafts were generally relatively small and thus could be manually handled and manipulated easily so as to permit the changing thereof. However, throughout the years, newly developed aircraft gradually and continuously became larger and heavier and thus were provided with wheels which were substantially large diameter and which were substantially heavy. For example, the Boeing 707, which has been utilized on a large scale for a number of years, uses wheels which are of a relatively large diameter and are too heavy for efficient manual handling. While aircraft maintenance personnel have been confronted with the problem of changing these large diameter and/or heavy wheels for a long period of time, nevertheless the handling and transporting of these large diameter and/or heavy wheels has continued to require substantial manual handling and manipulation in order to change an aircraft wheel. This renders the wheel changing operation difficult to perform, and thus labor consuming and resultingly inefficient.

In an attempt to simplify the wheel changing operation, various types of carts, dollies and other assorted devices have been developed over the years to assist in the wheel changing operation. While these different devices do assist in related phases of the wheel handling and transporting operation, nevertheless they still require that at least a large portion of the handling and manipulation of the wheel during the changing operation be performed manually. Thus these devices, though helpful, have not provided a real solution to the existing problem.

Accordingly, there has long existed, and still exists, a need for a structure which will permit large and/or heavy aircraft wheels to be easily and simply transported to any suitable location, with the structure also being capable of mechanically transferring the wheels to or from an aircraft wheel hub. Thus, it is an object of the present invention to provide a new and improved wheel handling apparatus which will satisfy the above-mentioned needs. Specifically, it is an object of the present invention to provide:

1. A new wheel handler apparatus which is particularly suitable for permitting easy transportation of large diameter and/or heavy wheels, particularly aircraft wheels.
2. A wheel handler apparatus, as aforesaid, capable of transferring wheels onto or off of the support hub or axle of the aircraft without requiring any substantial manual manipulation or handling of the wheel.
3. An apparatus, as aforesaid, capable of being connected to a self-propelled towing vehicle for permitting the apparatus to be freely moved about.
4. An apparatus, as aforesaid, having a main support axle adapted to support an aircraft wheel at each end thereof, and including power means mounted on the apparatus for permitting movement of the wheels axially onto or off of the ends of the main support axle.
5. An apparatus, as aforesaid, having an elevating mechanism mounted on the frame thereof and adapted to coact with a support surface, such as the ground, for permitting the aircraft wheels to be suitably moved upwardly out of engagement with the ground to a selected elevation whereby the aircraft wheels will be positioned adjacent to and substantially aligned with the aircraft support hub.
6. An apparatus, as aforesaid, wherein the support frame includes a roller system adapted to coact with the ground for permitting the apparatus to be freely moved when no wheels are mounted thereon, and including a jacking mechanism associated with the rollers for permitting elevation of the frame and elevation of any aircraft wheels supported thereon.
7. An apparatus, as aforesaid, wherein the aircraft wheels, when mounted on the apparatus, are positionable for rolling contact with the ground whereby the wheels are transported from one location to another by being in rolling engagement with the ground so as to thereby transmit their weight directly to the ground rather than on the frame of the apparatus.
8. An apparatus, as aforesaid, wherein suitable self-contained control and power systems are provided for permitting both elevating of the wheels and axial displacement of the wheels when desired.
9. An apparatus, as aforesaid, wherein manually controlled fluid pressure pumps are provided and are connected to suitable fluid pressure cylinders for controlling both the elevating of the wheels and the axial displacement of the wheels onto or off of the main support shaft.
10. An apparatus, as aforesaid, having wheel gripping structure movably mounted on the main support shaft for permitting the wheel to be easily engaged or disengaged.
11. An apparatus, as aforesaid, which permits ease of transporting wheels and ease of transferring wheels onto or off of an aircraft support axle, and which apparatus is relatively inexpensive to manufacture, is extremely simple to operate, possesses extreme durability, is substantially unaffected by adverse weather conditions and requires little maintenance or repair.

Other objects and purposes of the invention will be apparent to persons acquainted with the problems associated with changing aircraft wheels upon reading the following specification and inspecting the accompanying drawings.

3

Figure 1:
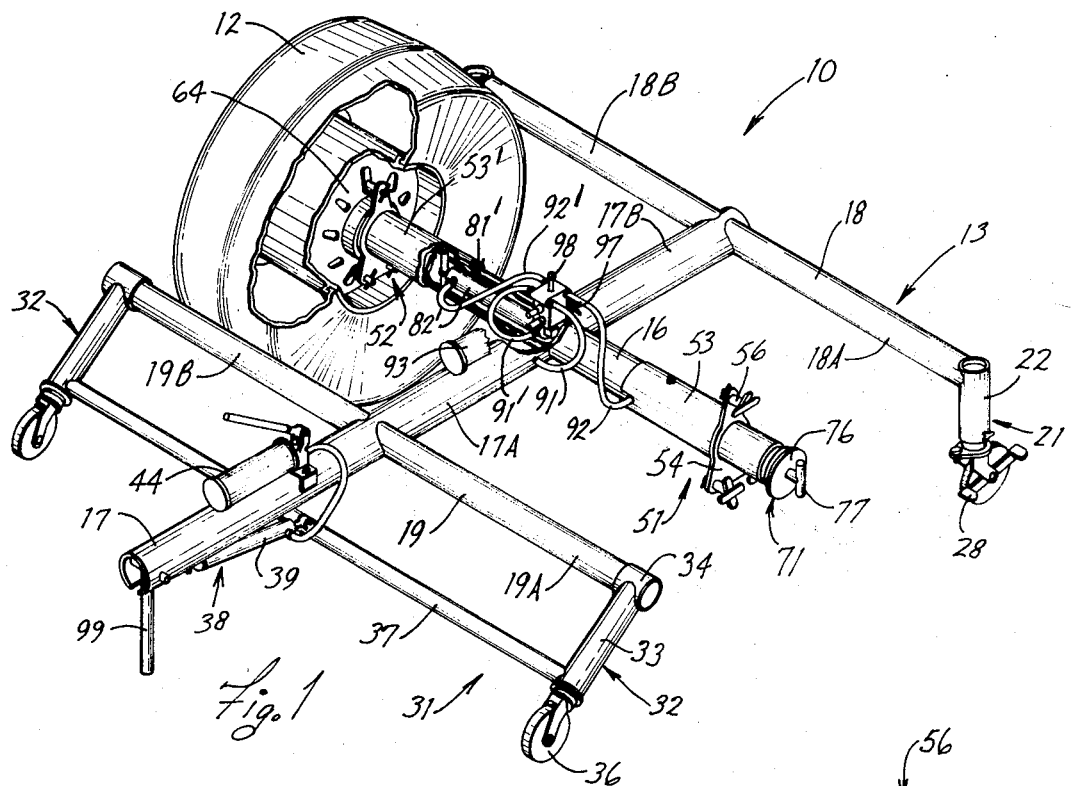
FIG. 1 is a perspective view of the wheel handler constructed according to the present invention, same being illustrated with one wheel mounted thereon.

FIG. 2 is a top view of the wheel handler illustrated in FIG. 1, same being illustrated with a pair of wheels mounted thereon.

FIG. 3 is a side view of the wheel handler illustrated in FIG. 2, same being illustrated with the elevating mechanism retracted whereby the wheels are disposed for rolling engagement with the ground.

Figure 4:
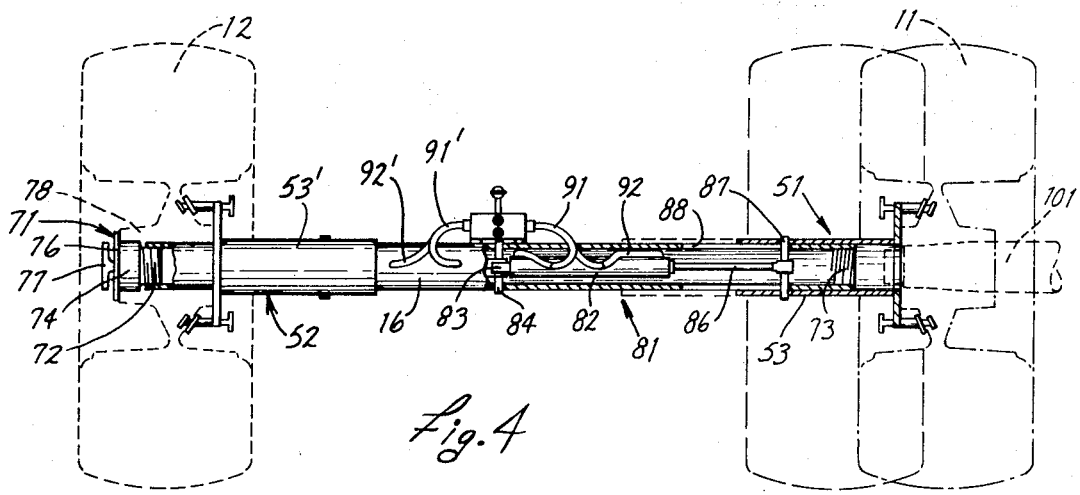

FIG. 4 is an elevational view, partially in cross section, taken substantially along the longitudinal axis of the main support axle.

Figure 5:
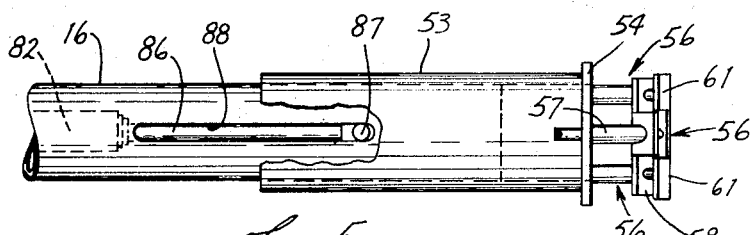

FIG. 5 is an enlarged, fragmentary top view of a portion of the wheel support and transfer assembly.

Figure 6:
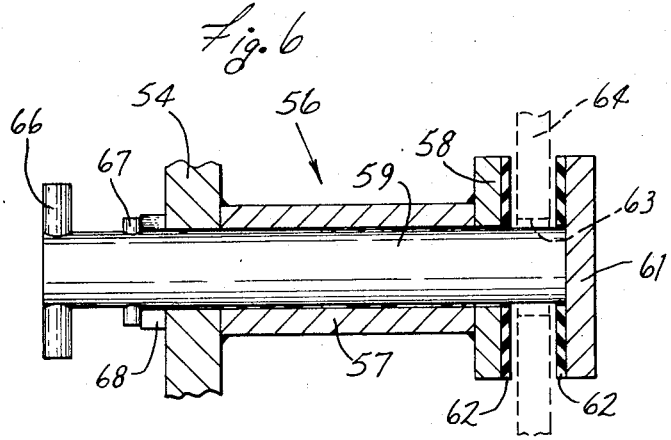

FIG. 6 is an enlarged, fragmentary sectional view of a wheel hub engaging device.

Figure 7:
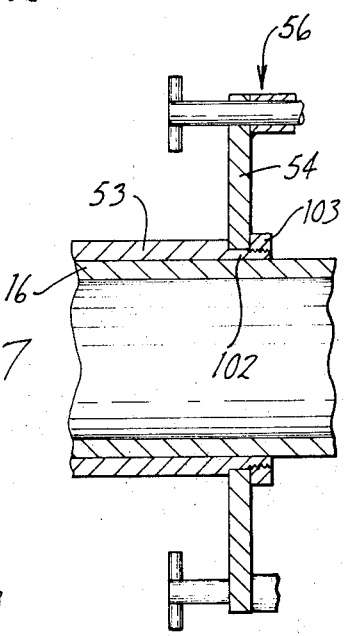

FIG. 7 is an enlarged, fragmentary sectional view of an alternate manner of mounting the wheel transfer plate on the main support axle.

Figure 8:
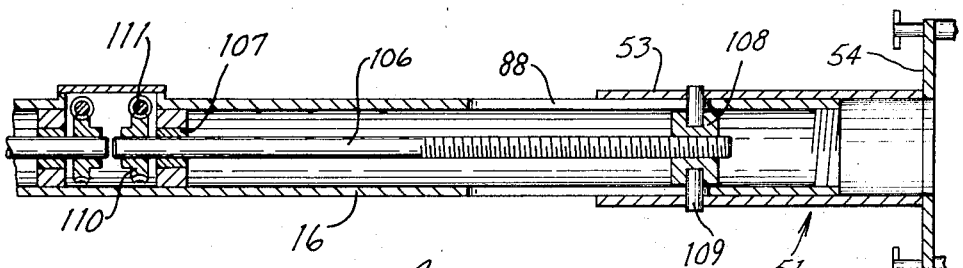

FIG. 8 is a fragmentary cross-sectional view through the main support axle and disclosing a modified mechanical system for permitting lateral displacement of the wheels.

Certain terminology will be used in the following description for convenience in reference only and will not be limiting. The words "upwardly," "downwardly," "rightwardly" and "leftwardly" will designate the directions in the drawings to which reference is made. The words "front" and "rear" will refer to the opposite ends of the apparatus as appearing at the left and right sides, respectively, of FIGS. 2 and 3. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

In general the objects and purposes of the present invention are met by providing an apparatus particularly suitable for handling and transporting large diameter and/or heavy wheels, particularly aircraft wheels. The apparatus includes a frame having a plurality of support rollers adapted to engage a support surface, such as the ground, the frame being connectible to a suitable towing vehicle for permitting the frame to be selectively moved about. The frame includes a primary support axle adapted to have wheels removable mounted adjacent opposite ends thereof. At least some of the support rollers are connected to the frame by an elevating mechanism for permitting raising of the frame and of the main support axle to permit wheels to be mounted thereon. The elevating mechanism is in one preferred embodiment, retractable to permit the wheels to be transported between selected locations by being disposed in rolling engagement with the ground. The apparatus is positionable adjacent the support axle of an aircraft, whereby the elevating mechanism is extendable to raise the wheels into coaxial alignment with the aircraft support hub. A wheel transfer mechanism is mounted on the frame for moving the wheel axially off the support axle onto the aircraft support hub, the transfer mechanism also being operable in a reverse manner for permitting a wheel to be drawn onto the support axle. The transfer mechanism includes a slideable hub structure having releasable clamping mechanisms engageable with the web plate of the wheel for permitting the wheel to be easily connected to or disconnected from the transfer mechanism.

DETAILED DESCRIPTION

FIGS. 1-6 illustrate therein one embodiment of a wheel handler constructed according to the present invention. However, it will be recognized that various modifications can be made in the illustrated structure without departing from the invention embodied therein.

Particularly, FIG. 1 illustrates a wheel handler 10 adapted to have wheels 11 and 12 removably supported thereon, which wheels are generally of large diameter and/or of substantial weight and are particularly designed for use on aircraft.

The handler 10 specifically includes a frame 13 having a transversely extending, hollow rigid support axle 16 provided for supporting wheels 11 and 12 thereon adjacent the opposite ends thereof. The frame 13 also includes a longitudinally extending drawbar 17, which drawbar specifically includes front and rear portions 17A and 17B fixedly interconnected, as by welding, to the support axle 16 substantially at the midpoint thereof.

A rear support rod 18 is fixedly connected to the rear drawbar portion 17B adjacent the rear end thereof and specifically includes opposite support rod portions 18A and 18B extending outwardly from and fixedly connected, as by welding, to the opposite sides of the drawbar. A similar front support rod 19 having opposite portions 19A and 19B is fixedly connected to, as by welding, and extends outwardly from the opposite sides of the front drawbar portion 17A. The front support rod 19 is fixedly connected to the front drawbar portion 17A at a point located intermediate the ends thereof. The support rods 18 and 19 are both substantially parallel to the support axle 16 and are spaced substantially equal distances from the support axle 16 on opposite sides thereof.

The wheel handler apparatus 10 further includes a pair of identical support leg assemblies 21 disposed adjacent the rearward end of the frame 13. Each leg assembly 21 specifically includes a support post 22 fixedly connected, as by welding, to the outer end of the rear support rod 18. The post 22 extends downwardly from the support rod 18 and telescopically receives therein a stem member 23 (FIG. 3). The stem 23 and post 22 are telescopically adjustable to vary the overall length thereof, the stem 23 and post 22 being fixedly interconnected by means of a locking pin 24 which extends through an opening in the post 22 so as to be received into a selected one of a plurality of openings (not shown) formed in the stem 23. The lower end of the stem 23 is provided with a conventional swivel-type support roller or caster 26 thereon, which caster 26 is disposed for rolling engagement with a support surface 27, such as a floor, a runway or the ground. The caster 26 is provided with a first braking device 28 thereon of conventional construction for permitting the caster to be locked relative to its horizontal rotational axis. A further conventional braking device 29 is also provided for preventing swiveling of the caster about the vertical longitudinal axis of the stem 23.

A jack or elevating mechanism 31 is mounted on the frame 13 and is disposed for selective coaction with the ground or support surface 27 for permitting the position of the support axle 16 to be selectively raised or lowered. The elevating mechanism 31 includes a pair of identical, retractable leg assemblies 32, each of which includes a support post 33 having its upper end fixedly secured to a cap 34. The caps 34 are rotatably mounted on the outer ends of the front support rod 19 for permitting selective pivotal or swinging movement of the leg assemblies 32 substantially within a vertical plane. Each leg assembly 32 has a conventional swivel-type support roller or caster 36 mounted on the lower end of the associated post 33, the casters 36 also being provided with conventional braking devices similar to the braking devices 28 and 29 described above for selectively preventing rolling or swiveling movement when the caster is disposed in engagement with the support surface 27.

The elevating mechanism 31 also includes an actuating mechanism 38 for causing selective swinging movement of the leg assemblies 32. The actuating mechanism 38 utilizes a power source, preferably in the form of a fluid pressure cylinder 39, which cylinder is mounted on the front drawbar portion 17A. The power cylinder 39 has its housing interconnected to the drawbar portion 17A by means of a pivot connection 41 disposed adjacent the one end of the power cylinder. A piston rod 42 extends outwardly from the other end of the power cylinder 39 and is pivotally interconnected to a bracket 43, which bracket is fixedly connected to a cross bar 37 which extends between and is fixedly connected to the posts 33 of the pair of retractable leg assemblies 32.

The fluid pressure cylinder 39 is preferably hydraulically actuated and is supplied with pressure fluid by means of a manually actuatable pump 44. The pump 44 is mounted on the front drawbar portion 17A and has a manually actuatable lever 47 for permitting actuation of the pump whereby pressurized fluid is supplied from pump 44 through the conduit 47 to the power cylinder 39. The pump 44 is of conventional construction and thus will not be described in detail.

Considering now the main support axle 16, same is provided with wheel support and transfer assemblies 51 and 52 (FIG. 1) disposed adjacent the opposite ends thereof, which assemblies 51 and 52 are adapted to coact with suitable wheels, such as the wheels 11 and 12 as illustrated in the drawings. The assemblies 51 and 52 are identical and thus only the assembly 51 will be described in detail, it being understood that the assembly 52 is structurally and functionally identical except that it extends outwardly in the opposite direction from the assembly 51.

As illustrated in FIGS. 1 and 4, the assembly 51 includes a support sleeve 53 concentric with and slideably supported on the support axle 16. A triangular transfer plate 54 is provided adjacent the outer end of the support sleeve 53 and, in this illustrated embodiment, is fixedly secured thereto. The transfer plate 54 has a plurality, here three, of engaging devices 56 mounted thereon for engagement with the web plate 64 of a wheel for permitting same to be mounted on or removed from the wheel handler apparatus 10.

The engaging devices 56 are identical and thus only one thereof will be described in detail. Particularly, the engaging device 56 includes, as illustrated in FIG. 6, a guide sleeve 57 fixedly secured to and extending outwardly from the outer face of the transfer plate 54. The outer end of the guide sleeve 57 is fixedly interconnected, as by welding, to a fixed clamp jaw 58. An actuator pin 59 is rotatably and slideably received within the guide sleeve 57 and has a further clamp jaw 61 fixedly secured to the outer end thereof, which clamp jaw is axially spaced from and disposed opposite the fixed clamp jaw 58. The jaws 58 and 61 are each preferably provided with resilient linings or faces 62 fixedly secured thereon. The movable clamp jaw 61 is of an elongated shape so as to movable through an elongated opening 63 formed in the web plate 64 of the wheel hub, whereby the jaws 58 and 61 are thus positionable on opposite sides of the web plate 64 substantially as illustrated in FIG. 6. The actuator pin 59 is further provided with a handle 66 secured to the other end thereof for permitting selected rotation of the pin 59 and the associated jaw 61. A cam pin 67 is fixedly secured to the actuator pin 59 and coacts with an annular ramp cam 68 formed on the inner side of the transfer plate 54, whereby selected rotation of actuator pin 59 and sliding engagement of cam pin 67 with ramp cam 68 causes the jaw 61 to be rotated so as to extend across the elongated opening 63 while the clamp jaw 61 is simultaneously moved axially inwardly toward the jaw 58 so as to permit the web plate 64 to be clampingly engaged between the opposed jaws 61 and 58.

The wheel transfer and support assembly 51 also includes a knock-off hub 71 (FIG. 4) having a reduced diameter threaded portion 72 adapted to be received in and threadably engaged with the internal threaded end portion 73 of the support axle 16. The knock-off hub 71 also includes an enlarged cylindrical hub portion 74 having an outer diameter substantially equal to the outer diameter of the support shaft 16 so as to function as an extension thereof. The enlarged hub portion 74 is provided with an enlarged annular retaining flange 76 adjacent the outer end thereof, which flange 76 has a handle or lug 77 projecting therefrom for permitting the hub 71 to be engaged and manipulated, either by hand or by means of a tool. The knock-off hub 71 is adapted to be received within and rotatably support the hub 78 of the wheel 11 or 12 as illustrated in FIG. 4 when the wheel is mounted on the wheel handler apparatus 10. With the wheel mounted on the axle as illustrated in FIG. 4, the annular flange 76 of the knock-off hub 71 radially overlaps the outer end of the wheel hub 78 so as to retain the wheel on the support axle 16.

The wheel support and transfer assembly 51 further includes a transfer mechanism 81 (FIG. 4) for permitting powered movement of the wheel 11 or 12 either axially onto or axially off of the end of the support axle 16. The transfer mechanism 81 includes a fluid pressure power cylinder 82 which is preferably hydraulically actuated and of the double-acting type. The power cylinder 82 is provided with a flange 83 fixedly secured to one end of the housing thereof, which flange 83 is in turn connected to a pin 84 which extends diametrically across the support axle 16 for anchoring the inner end of the cylinder. A piston rod 86 slideably extends outwardly from the other end of the power cylinder 82 and is provided with a transfer control pin 87 mounted therein, which pin extends diametrically across the support axle 16 and is slideably supported thereon by means of diametrically opposed, elongated slots 88 formed in the support axle 16. The opposite ends of the control pin 87 are received within suitable openings formed in the support sleeve 53 for axially securing the support sleeve 53 relative to the piston rod 86. Pressurized fluid is selectively supplied to the opposite ends of the power cylinder 82 by means of conduits 91 and 92 for permitting selective extension or retraction of the support sleeve 53 as desired.

Pressurized fluid is supplied to the power cylinder 82 from a fluid pressure pump 93 (FIGS. 1-3), which pump 93 is mounted on the drawbar 17 and has a manually actuable lever 94. The pump 93 is of conventional construction and thus will not be described in detail. Pressurized fluid from the pump 93 flows through an intermediate conduit 96 to a valve structure 97, which valve structure is a conventional four-way valve device and includes a manually actuable valve shift lever 98. The valve lever 98 is manually shiftable so as to selectively position the valve member (not shown) so as to permit pressurized fluid to flow from the pump 93 into either conduit 91 or conduit 92 depending upon whether the support sleeve 53 is to be axially extended or retracted. Alternately, when the support and transfer assembly 52 is to be actuated, then the valve lever 98 is shifted into still a further selected position to permit pressurized fluid to flow into either position 91' or 92' so as to permit selected axial extension or retraction of the opposite support sleeve 53'.

The wheel handler apparatus 10 is also provided with suitable coupling means for enabling the apparatus to be easily connected to or disconnected from a suitable towing vehicle. In the illustrated embodiment, a T-shaped coupling pin 99 is pivotally mounted adjacent the forward end of the drawbar 17, which pin is adapted to be received within a suitable mating coupling member or socket positioned on the rearward end of a towing vehicle for enabling the apparatus 10 to be moved about as desired and for permitting the apparatus 10 to be easily disconnected from the towing vehicle. The coupling pin 99 merely represents one form of coupling usable with the wheel handler apparatus, and it will be apparent to persons of ordinary skill in the art that numerous other types of coupling devices could be utilized.

OPERATION

The operation of the apparatus embodying the invention will be described in detail hereinbelow for a better understanding thereof.

It first will be assumed that the wheel handler apparatus 10 is provided with a pair of wheels 11 and 12 thereon substantially as illustrated in dotted lines in FIGS. 2 and 4. The wheels 11 and 12 are supported on the support axle 16 by means of the wheel hubs 78, which hubs 78 are rotatably supported on the ends of the axle 16 and on the enlarged hub portions 74 of the knock-off hubs 71. To permit the wheels 11 and 12 to be rotated relative to the main axle 16, the engaging devices 56 will be disconnected from the web plates 64. The elevating mechanism 31 will also be moved to the retracted position illustrated in solid lines in FIG. 3 so that the wheel handler apparatus, when connected to a towing vehicle, will be towable in the manner of a two-wheel trailer, the wheels 11 and 12 being disposed for rolling engagement with the support surface 27 as illustrated in FIG. 3. The wheel handler apparatus 10 will thus be movable by a towing vehicle to any selected location, such as adjacent an aircraft wheel hub 101 (FIG. 4) onto which the wheel 11 is to be mounted. This makes possible the use of the large aircraft wheels themselves to support the apparatus as it is transported across the airport which in turn permits the use of only small and inexpensive wheels, as casters, for moving the unit as needed for alignment purposes preliminary to the actual changing operation.

After the wheel handler apparatus 10 has been moved to position the wheel 11 adjacent the aircraft hub 101, the power cylinder 39 will be energized by means of manual operation of the pump 44, whereupon the piston rod 42 will be extended so as to swing the pair of legs 32 downwardly until the front casters 36 contact the support surface 27. Further extension of the power cylinder 39 will cause the complete wheel handler apparatus 10, particularly the frame 13 thereof, to pivotally swing (clockwise in FIG. 3) about the point of contact C between the wheels 11 and 12 and the support surface 27, which pivotal movement will continue until the rear casters 26 move downwardly into engagement with the support surface 27. Continued extension of the power cylinder 39 will then cause further lifting of the frame 13, which lifting will now occur as pivotable movement about the point of contact between the casters 26 and the support surface 27, thereby causing the axle 16 to be raised upwardly away from the support surface 27 so as to move the wheels 11 and 12 upwardly out of engagement with the support surface 27. The extension of the power cylinder 39 will be continued until the axis of the support axle 16 is disposed at substantially the same horizontal elevation as the axis of the aircraft hub 101.

With the wheels 11 and 12 elevated from the support surface 27, the engaging device 56 will be actuated to clampingly engage the wheel 11 to the transfer plate 54. Particularly, each of the actuator pins 59 will be extended outwardly so as to insert the jaw 61 through one of the openings 63, whereupon the pin 59 will then be rotated to position the jaw 61 transversely across the opening 63, which rotation will also cause a camming engagement between pin 67 and ramp cam 68 so as to move the clamp jaw 61 toward the clamp jaw 58 to clampingly engage the web plate 64 therebetween. In this manner the wheel 11 will be fixedly interconnected to the transfer plate 54.

The knock-off hub 71 will then be removed so that the wheel 11 is thus totally supported by the outer end of the main axle 16 and the transfer plate 54. The complete wheel handler apparatus 10 can then be manually moved either longitudinally and/or laterally by manual pushing thereof so as to position the main axle 16 closely adjacent to and in alignment with the aircraft hub 101. The handler 10 is preferably positioned such that the outer end of the aircraft hub 101 is positioned closely adjacent to or extends slightly into the end of the main axle 16. This manual manipulation of the apparatus 10 is permitted due to the swivel casters 26 and 36, which swivel casters are manually braked to prevent further movement of the apparatus 10 after same has been moved into the selected position.

With the apparatus positioned as described above, the pump 93 is then manually actuated to supply pressure fluid to the valve assembly 97, which assembly has been previously manually shifted to provide communication with the conduit 91, whereby the pressure fluid flows through conduit 91 into the rearward end of the power cylinder 82. Flow of pressure fluid into the rearward end of power cylinder 82 causes an outwardly extension of piston rod 86, which in turn causes an outward axial movement of support sleeve 53 and transfer plate 54, whereby the wheel 11 is thus shifted axially outwardly from the dotted line position of FIG. 4 into the dash-dot position of FIG. 4. This axial shifting of the wheel 11 causes it to be slidably moved onto the aircraft hub 101, the wheel 11 thus being transferred directly from the support axle 16 onto the aircraft hub 101 without requiring any manual manipulation of the wheel 11.

After the wheel 11 has been properly moved onto the aircraft hub 101, the engaging devices 56 are released by withdrawing the movable clamp jaws 61 through the openings 63, whereupon the valve assembly 97 is manually shifted to permit pressure fluid to be supplied through conduit 92 into the outer end of the power cylinder 82, whereupon the piston rod 86 causes the support sleeve 53 and transfer plate 54 to be axially retracted back to their original positions. The apparatus 10 can then be moved away from the aircraft to permit the wheel 11 to be suitably fastened thereto in a conventional manner.

After the wheel 11 has been removed from the wheel handler apparatus 10, same will again be connected to the towing vehicle and towed as described above except that the apparatus 10 will now be rollingly supported on the pairs of casters 26 and 36. This is now satisfactory since the principal weight has been removed.

While the operation as described above has related to the removal of a wheel from the wheel handler apparatus, it will be apparent that the reverse operation will be performed when it is desired to mount a wheel on the apparatus. For example, assuming that it is desired to remove a wheel from an aircraft hub and mount same on the main axle 16, then the wheel handler 10 will be positioned adjacent the aircraft and the elevating mechanism 31 energized so as to substantially coaxially align the main axle 16 with the aircraft hub. When this has been accomplished, the cylinder 81 will be energized to cause the transfer plate 54 to be moved outwardly so as to permit the engaging device 56 to be connected with the web plate 64 of the wheel whereupon the cylinder 82 will be energized in the reverse direction to retract the transfer plate 54 axially back onto the support axle 16, which retraction will cause the wheel to be pulled from the aircraft hub onto the support axle 16, after which the knock-off hub 71 will be threadably inserted into the end of the axle 16 so as to retain the wheel thereon. If desired, the wheel can then be transported by maintaining same out of engagement with the support surface 27 whereby the apparatus 10 is rollingly supported on the casters 26 and 36. Alternately, the engaging device 56 can be disconnected from the web plate 64 so as to permit the wheel to freely rotate on the axle 16, whereupon the elevating device 31 can be de-energized to permit the legs 32 to retract, whereupon the wheel will rollingly engage the ground and thus permit transporting thereof in this manner.

MODIFICATIONS

FIG. 7 illustrates therein a modified mounting structure for securing the transfer plate 54 to the support sleeve 53. In this modification the support sleeve 53 is provided with a reduced diameter portion 102 on which is rotatably supported the transfer plate 54. A threaded collar 103 is provided on the outer end of the support sleeve 53 for axially retaining the transfer plate 54 while permitting the plate 54 to rotate relative to the sleeve 53.

The structure illustrated in FIG. 7 is preferred when it is desired to transport the wheels 11 and 12 by permitting them to rollingly engage the ground (as illustrated in FIG. 4) since this construction permits the transfer plate 54 to be nonrotatably interconnected to the wheel during the transporting operation, and thus does not require that the engaging devices 56 be disengaged during the transporting operation.

FIG. 8 illustrates therein still another modification of the present invention, which modification relates to a mechanical device for permitting extension or retraction of the wheel support and transfer assemblies 51 and 52. Particularly, as illustrated in FIG. 8, the main axle 16 is provided with an actuator shaft 106 concentrically disposed therein, which actuator shaft is rotatably supported at one end by means of an internal bearing 107. The other end of the actuator shaft is threadably engaged with a slide block 108 which is slidably received within the axle 16 and is prevented from rotating by means of opposed pins 109 which extend through and are slidably guided by means of parallel, elongated slots 88. The outer ends of the pins 109 are secured to the support sleeve 53, to which is connected the transfer plate 54 as explained in detail above. The shaft 106 is provided with a gear 110 fixed on the inner end thereof, which gear is in meshing engagement with a worm member 111 which is rotatably supported on the axle 16. The outer end of the worm 111 is provided with a conventional driving connection, which may be of square or hexagonal configuration, for permitting a conventional hand crank (not shown) to be connected thereto for permitting manual rotation of the worm 111, which manual rotation of worm 111 causes a corresponding rotation of the shaft 106, whereby the support sleeve 53 is either axially extended or retracted. Two such actuating mechanisms are disposed within the axle 16 and each can be selectively driven by means of a removable hand crank so as to permit the wheels supported adjacent the opposite ends of the axle 16 to be axially retracted onto the axle 16 or axially removed from the axle 16 in substantially the same manner described in detail above.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for handling and/or transporting large diameter and/or heavy wheels, comprising:
    frame means including cantilevered shaft means, said shaft means extending substantially horizontally;
    roller means mounted on said frame means and adapted for rolling engagement with a support surface for permitting said apparatus to be rollingly moved about;
    a wheel support device adapted to have at least one wheel removably mounted thereon, said support device being movably mounted on said shaft means for movement relative thereto in a direction substantially parallel to the axis of said shaft means; and
    movement means mounted on said frame means and coacting with said support device for selectively causing linear movement of said support device in said direction.

2. An apparatus for handling and/or transporting large diameter and/or heavy wheels, comprising:
    frame means including an elongated tubular axle member;
    roller means mounted on said frame means and adapted for rolling engagement with a support surface for permitting said apparatus to be rollingly moved about;
    first and second wheel support means each adapted to have a wheel removably mounted thereon, said first and second support means being movably mounted on said axle member adjacent the opposite end thereof for movement relative thereto in a direction substantially parallel to the longitudinal axis of said axle member; and
    movement means mounted on said frame means and coacting with said first and second support means for selectively effecting linear movement of one of said support means relative to said axle member in a direction substantially parallel to said longitudinal axis, thereby facilitating the mounting or removal of a wheel from said apparatus.

3. An apparatus for handling and/or transporting large diameter and/or heavy wheels, comprising:
    frame means including cantilevered shaft means, said shaft means extending substantially horizontally and having a substantially cylindrical hub portion adjacent the free end thereof adapted to support thereon a wheel hub;
    roller means mounted on said frame means and adapted for rolling engagement with a support surface for permitting said apparatus to be rollingly moved about;
    removable holding means secured to said shaft means adjacent the free end thereof, said holding means including means extending radially outwardly beyond the periphery of said cylindrical hub portion for defining a first abutment;
    transfer means slidably supported on said shaft means at a location spaced inwardly from the free end thereof, said transfer means extending radially outwardly of said cylindrical hub portion and defining a second abutment disposed opposite and axially spaced from said first abutment, whereby a wheel hub supported on said cylindrical hub portion is axially confined between said first and second abutments; and
    drive means mounted on said frame means and coacting with said transfer means for selectively causing slidable linear movement of said transfer means toward and away from the free end of said hub portion for causing a wheel to be pushed off or pulled onto said cylindrical hub portion.

4. An apparatus according to claim 3, further including elevating means mounted on said frame means and adapted to coact with said support surface for selectively effecting the elevation of said shaft means relative to said support surface.

5. An apparatus according to claim 1, further including elevating means mounted on said frame means and adapted to coact with said support surface for selectively effecting the elevation of said shaft means relative to said support surface.

6. An apparatus according to claim 2, further including elevating means mounted on said frame means and adapted to coact with said support surface for selectively effecting the elevation of the longitudinal axis of said axle member relative to said support surface.

7. An apparatus according to claim 6, wherein said roller means includes first and second support rollers, and said elevating means being disposed between said first support roller and said frame means whereby extension of said elevating means causes said first support roller to contact said support surface for causing the longitudinal axis of said axle member to be raised relative to said support surface.

8. An apparatus according to claim 6, wherein said movement means includes fluid pressure cylinder means operably interconnected to said first and second support means for effecting selected linear movement of one of said support means.

9. An apparatus according to claim 8, wherein said cylinder means includes first and second fluid pressure cylinders disposed within said axle member, said first and second cylinders respectively having first and second extendable piston rods interconnected to said first and second support means, respectively;
    pump means mounted on said frame means for supplying pressurized fluid to said first and second cylinders; and
    valve means disposed between said pump means and said first and second cylinders for selectively controlling the flow of fluid to said cylinders.

10. An apparatus according to claim 9, wherein said first and second cylinders are each of the double-acting type for permitting the respective support means to be selectively moved either axially outwardly or axially inwardly relative to said axle member for causing a wheel to be removed from or mounted on the axle member.

11. An apparatus according to claim 10, wherein said first support roller is swingably mounted on said frame means for swingable movement within a substantially vertical plane; and
    said elevating means including a fluid pressure cylinder coacting between said frame means and said swingable support roller for selectively causing said first support roller to vertically swing relative to said frame means.

12. An apparatus according to claim 1, wherein each said wheel support means includes a sleeve portion slidably mounted on said axle member for linear movement in a direction substantially parallel to the axis of said sleeve portion and parallel to the longitudinal axis of said axle member, each said sleeve portion being interconnected to and selectively linearly movably by said movement means each said support means further including a transversely extending mounting plate means mounted on said sleeve portion and a plurality of releasable wheel engaging devices mounted on said plate means and disposed for gripping the web plate of a wheel hub.

13. An apparatus according to claim 12, wherein said movement means includes a fluid pressure cylinder mounted on said frame means and having a reciprocating piston rod disposed for linear movement in a direction substantially parallel to the axis of said sleeve portion, said piston rod being interconnected to said sleeve portion for causing linear movement thereof.

14. An apparatus according to claim 12, further including means for rotatably supported a wheel upon said frame means whereby said wheel can be disposed for rolling engagement with said support surface when being transported from one location to another.

15. An apparatus according to claim 2, wherein said frame means includes an elongated draw bar having coupling means disposed adjacent the forward end thereof for permitting said apparatus to be releasably connected to a suitable tow vehicle, said elongated axle member being fixedly secured to and extending transversely outwardly from opposite sides of said draw bar;

said roller means including first and second pairs of support rollers mounted on said frame means and disposed in laterally spaced relationship from one another along the longitudinal direction of said draw bar.

16. An apparatus according to claim 15, wherein at least one of said pairs of support rollers comprises a pair of swivel casters.

17. An apparatus according to claim 15, further including jack means mounted on said frame means and adapted to coact with said support surface for selectively effecting the elevation of said axle member relative to said support surface.

18. An apparatus according to claim 17, wherein said first and second pairs of support rollers are horizontally laterally positioned on opposite sides of said axle member, and wherein said jack means is disposed between said frame means and one of said pair of rollers for effecting selective vertical movement of said one pair of rollers.

* * * * *